United States Patent
Peitz

(10) Patent No.: US 9,555,682 B2
(45) Date of Patent: Jan. 31, 2017

(54) CONSTRUCTED WHEEL SUPPORT

(71) Applicant: Benteler Automobiltechnik GmbH, Paderborn (DE)

(72) Inventor: Detlev Peitz, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/730,861

(22) Filed: Jun. 4, 2015

(65) Prior Publication Data
US 2015/0352918 A1   Dec. 10, 2015

(30) Foreign Application Priority Data
Jun. 5, 2014  (DE) .................. 10 2014 107 953

(51) Int. Cl.
*B23K 1/00* (2006.01)
*B60G 7/00* (2006.01)
*B60G 3/20* (2006.01)
*F16F 1/368* (2006.01)

(52) U.S. Cl.
CPC .............. *B60G 7/001* (2013.01); *B23K 1/00* (2013.01); *B60G 3/202* (2013.01); *B60G 7/008* (2013.01); *F16F 1/3686* (2013.01); *B60G 2200/182* (2013.01); *B60G 2206/50* (2013.01); *B60G 2206/722* (2013.01); *B60G 2206/82013* (2013.01)

(58) Field of Classification Search
CPC ......... B60G 7/001; B60G 3/202; B60G 7/008; B60G 2200/182; B60G 220/722; B60G 2206/50; B60G 2206/820136; F16F 1/3686; B23K 1/00

USPC .................................................... 280/124.128
See application file for complete search history.

(56) References Cited

U.S. PATENT DOCUMENTS

| 3,292,944 A | 12/1966 | Dangauthier | |
|---|---|---|---|
| 4,372,418 A | 2/1983 | Dangel | |
| 5,310,211 A | 5/1994 | DelBeke | |
| 6,152,468 A * | 11/2000 | Glaser | B60G 21/051 280/124.134 |
| 6,935,646 B2 * | 8/2005 | Inoue | B60G 3/145 280/124.106 |

(Continued)

FOREIGN PATENT DOCUMENTS

| CN | 202378655 U | 8/2012 |
|---|---|---|
| DE | 29519965 U1 | 4/1997 |

(Continued)

OTHER PUBLICATIONS

H. Dahlkamp, DE 29519965 English Machine Translation.*
Haegele et al. DE 10 2010 027752 English Machine Translation.*
Wan et al. CN 202378655 English Machine Translation.*

*Primary Examiner* — Karen Beck
(74) *Attorney, Agent, or Firm* — Hauptman Ham, LLP

(57) ABSTRACT

A wheel support for arrangement on a motor vehicle axle is disclosed on a multi-link axle having a flange for receiving a wheel hub and at least two receptacles for rotatable coupling to links, the wheel support being coupled to a trailing link by means of thermal joining, which wheel support is distinguished by the fact that the wheel support is configured as a welded component and has a main body region which has at least two sheet metal components which are coupled to one another by way of thermal joining.

9 Claims, 4 Drawing Sheets

(56) References Cited

U.S. PATENT DOCUMENTS

Figure 1:
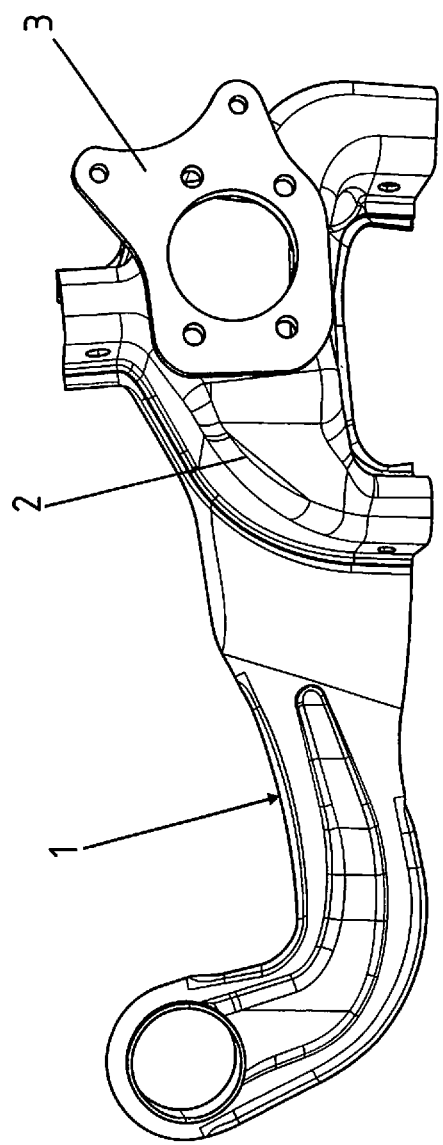

| | | | |
|---|---|---|---|
| 7,204,498 B2* | 4/2007 | Alesso | B60B 35/007 280/124.106 |
| 7,520,516 B2* | 4/2009 | Murata | B60G 3/145 280/124.116 |
| 7,832,749 B2* | 11/2010 | Lee | B60G 7/001 280/124.116 |
| 2008/0150249 A1 | 6/2008 | Murata | |
| 2011/0068619 A1* | 3/2011 | Werner | B22D 19/00 301/127 |
| 2014/0216124 A1* | 8/2014 | Frehn | B21B 1/08 72/201 |
| 2016/0090121 A1* | 3/2016 | Conner | B62D 7/18 280/93.512 |

FOREIGN PATENT DOCUMENTS

| | | |
|---|---|---|
| DE | 102010027752 A1 | 10/2011 |
| EP | 0025744 A1 | 3/1981 |
| EP | 1612068 A1 | 1/2006 |
| JP | S6067203 A | 4/1985 |
| JP | 2012086642 A | 5/2012 |
| JP | 2014004953 A | 1/2014 |
| KR | 1020100045789 A | 5/2010 |
| WO | 2007066205 A1 | 6/2007 |

* cited by examiner

CONSTRUCTED WHEEL SUPPORT

CROSS-REFERENCE TO RELATED APPLICATIONS

This application claims the benefit of German Application No. 10 2014 107 953.1, filed Jun. 5, 2014, which is incorporated herein by reference in its entirety.

The present invention relates to a constructed wheel support for a multi-link axle for arrangement on a motor vehicle in accordance with the features in the preamble of patent claim 1.

Motor vehicles have wheel suspension systems, in order to produce a kinematic coupling with the motor vehicle wheel, with the result that the motor vehicle wheel can be moved relatively with respect to the motor vehicle body and can compress and rebound.

The aim here is to design the unsprung wheel masses together with the wheel-side components to be as light as possible, in order to achieve high agility and dynamics in the driving behavior of the motor vehicle.

At the same time, predefined geometric dimensions have to be adhered to, in order to obtain the required geometric degrees of freedom in the region of the installation space, with the result that no axle components collide during the compression or rebound operation.

To this end, in particular, independent wheel suspension systems of multi-link design are known from the prior art. Here, a wheel support is provided which is coupled to the motor vehicle body in a relatively movable manner via a plurality of links.

A wheel hub is coupled to the wheel support itself, and then in turn the wheel is coupled in a rotationally movable manner to said wheel hub. The wheel support can optionally be penetrated by a drive shaft, in order to transmit a corresponding drive output power for propulsion of the motor vehicle.

However, a multi-link axle of this type is expensive in terms of construction and production technology in relation to a simpler axle construction, for example a torsion beam axle. A wheel support of this type on a multi-link axle is known, for example, from DE 295 19 965 U1.

In order to then also provide a multi-link axle for all motor vehicle classes, in particular also the intermediate car class or else compact car class, the production costs have to be reduced, with strength which at least remains constant and/or lower component weight.

It is therefore an object of the present invention, proceeding from the prior art, to provide a wheel support for a multi-link axle for arrangement on a motor vehicle, which wheel support has a strength which at least remains constant in comparison with the wheel supports which are known from the prior art, with lower production costs and a lower component weight.

According to the invention, the abovementioned object is achieved by way of a wheel support in accordance with the features in patent claim 1. Advantageous design variants of the present invention are the subject matter of the dependent patent claims.

The wheel support for arrangement on a motor vehicle axle on a multi-link axle has a flange for receiving a wheel hub and at least two receptacles for rotatable coupling to links, the wheel support being coupled to a trailing link by means of thermal joining, and is distinguished according to the invention by virtue of the fact that the wheel support is configured as a welded component and has a main body region which has at least two sheet metal components which are coupled to one another by way of thermal joining, the main body region having a lattice-like structure.

According to the invention, the wheel support itself is therefore not produced as a sheet metal formed component or shell component and, in particular, deep-drawn component, but rather as a welded component which consists of a plurality of individual sheet metal parts. According to the invention, the production costs can therefore first of all be reduced as a result, since a complicated forming die does not have to be provided for producing a single-shell deep-drawn component. At the same time, the degrees of design freedom can be increased, since they do not depend on local degrees of deformation of a single-shell sheet metal formed component. Moreover, the possibility arises that a plurality of individual sheet metal components which are connected by means of welding can be designed in each case individually in terms of strength and/or wall thickness and optionally material quality depending on the loads which are expected. There is a substantial advantage precisely here, since the component weight and the production costs can be reduced at the same time as a result, in particular in comparison with wheel supports which are known from the prior art and are configured either as sheet metal formed components, milled components or else as cast components and/or components which are produced using forging technology. The wheel support preferably has three receptacles for coupling to links. There is a further essential advantage precisely here, by virtue of the fact that the three receptacles can be arranged spatially separated from one another in any desired manner on the wheel support, in particular in the motor vehicle vertical direction and motor vehicle longitudinal direction, but also in the motor vehicle transverse direction, it correspondingly not being necessary for the wheel support to be produced as a complexly shaped formed component, but rather having high degrees of design freedom here with an inexpensive production option on account of the production as a welded component.

The wheel support according to the invention therefore has a flange, a wheel hub being coupled to the flange. The wheel hub is, in particular, coupled to the flange in a positively locking manner via a screwed connection consequently. The flange itself is coupled in an integrally joined manner to the other sheet metal components. The wheel support which is produced in this way is in turn likewise coupled by means of an integrally joined connection to a trailing link of a motor vehicle. The trailing link itself is, in particular, also produced as a single-piece component of a uniform material, in particular as a shell component.

The thermal joining is configured as a welding process, in particular in the case of steel materials. Here, spot welding can be performed or, as an alternative, relatively long and/or continuous welded seams can also be produced for coupling purposes.

In particular, the wheel support according to the invention is used for producing a multi-link axle. This means that at least two, preferably three receptacles are configured on the wheel support, in order to receive pivot bearings and/or threaded bolts at the end of links, in particular control arms, and are rotatably coupled to the latter, in order to ensure the kinematic coupling to the motor vehicle wheel.

According to the invention, the wheel support has a lattice-like structure in its interior or the main body region is configured as a lattice-like structure. Here, the lattice-like structure affords the advantage that it can be adapted as required to loads which occur and can be designed and dimensioned in principle in accordance with the forces which are to be expected and act on the motor vehicle wheel and the wheel support. At the same time, the component weight of the wheel support is reduced on account of the lattice-like structure, with a strength which at least remains constant or else is increased.

A constituent part of the invention is therefore also a wheel support arrangement or a trailing link with a wheel support welded onto it, the wheel support of the wheel support arrangement or of the longitudinal carrier then being configured according to the invention with the lattice-like structure in the main body region.

To this end, two clasp components are configured which are in each case produced as a sheet metal formed component, but not as a shell component. In particular, this is distinguished by the fact that bending is carried out in each case about a bending axis which is offset in parallel, but not about a plurality of bending axes which are at an angle with respect to one another. A respective clasp component can therefore also be produced by way of bending or folding at the edges and does not necessarily have to be produced as a three-dimensionally formed pressed component or else deep-drawn component.

Furthermore, the wheel support is distinguished by the fact that a further supporting component is provided which likewise configures the wheel support in the region of the trailing link and therefore couples the wheel support to the trailing link. The supporting component therefore serves to reinforce the longitudinal carrier, to support the flange and/or the wheel support, in particular on a clasp component, and to configure a third receptacle for coupling to a further link for configuring the multi-link axle. Here, the supporting component is preferably of U-shaped configuration in cross section and has a main web with limbs which extend from the main web. The receptacle for coupling to the further link is then further preferably configured by way of two openings in the limbs. As an alternative, it is conceivable within the context of the invention to configure the supporting component with two clasp components which are offset in parallel to one another. The supporting component in both abovementioned design variants in conjunction with the abovementioned clasp components then forms the lattice-like structure within the main body.

There is a further advantage of the wheel support according to the invention precisely here. All abovementioned individual components including the clasp components but also the supporting component can be produced independently of one another. It is thus possible to in each case select a material which is different, in particular a material on a steel alloy basis. Optionally in addition or as an alternative, it is possible to select a different wall thickness of the individual components. It is also in turn possible that the respective component has wall thicknesses which differ from one another. Furthermore, it is possible within the context of the invention to partially temper each individual component individually. To this end, at least one component is particularly preferably hot formed and press hardened. The influence in the heat affected zone itself in the case of subsequent thermal joining can be ignored here within the context of the invention with regard to the reduced strength in this region, since it is compensated for by way of the structural construction, in particular by way of the lattice structure.

In interaction with the abovementioned advantages, the possibility in turn arises of configuring the individual components in the region of the receptacle itself in such a way that, for example, the receptacles for attaching the links or bearings for the links and, in particular, threaded bolts for the links can be of reinforced configuration. This reinforcement can be configured, for example, by way of an increase in the wall thickness, but also in at least local partial tempering of the component itself.

To this end, the two clasp components preferably then together form a receptacle for attaching a motor vehicle link in each case at their ends, the end of one clasp component lying opposite the end of the second clasp component in relation to the motor vehicle longitudinal direction. The same applies to the other end of the clasp components, the receptacle also in turn being configured here for the motor vehicle links by way of the two ends of each clasp component which lie opposite one another.

Substantially the main body region is further particularly preferably configured by the two clasp components and/or enclosed by the latter. The main body region itself is preferably of hollow configuration. This in turn affords the possibility that a drive shaft is guided through here, with the result that the wheel support according to the invention can be used both in the case of non-driven motor vehicle axles but also in the case of driven motor vehicle axles. Furthermore, simple assembly of the wheel hub itself is then also possible in the region of the hollow main body, which in turn reduces the production costs of a motor vehicle axle which is produced using the wheel support according to the invention.

Further advantages, features, properties and aspects of the present invention result from the following description. Preferred embodiments are shown in the diagrammatic figures. These serve for simple understanding of the invention. Here, the features which are mentioned above and are also mentioned in the following text can be combined as desired within the context of the invention with the advantages which arise.

Figure 2:
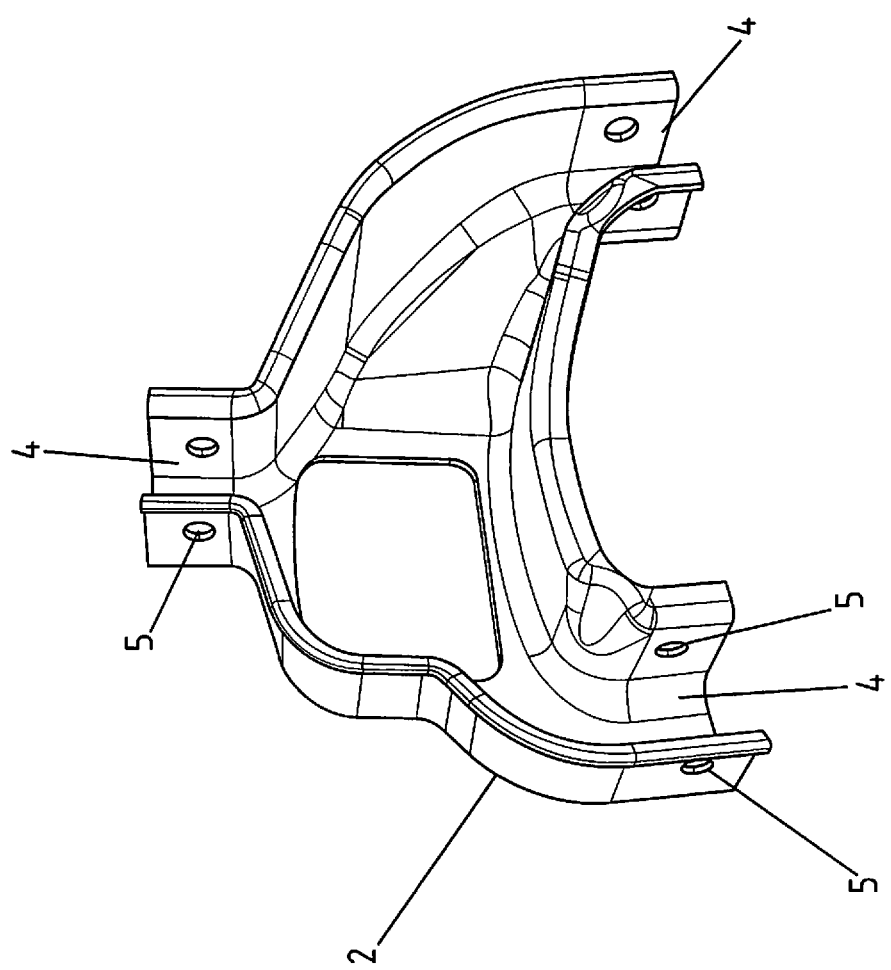
Figure 3:
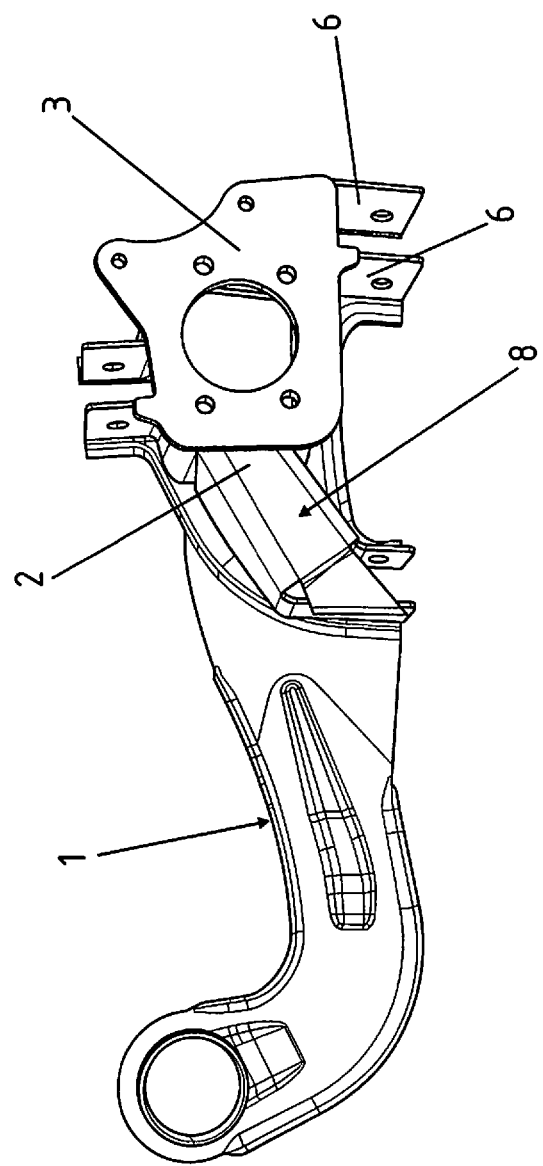
Figure 4:
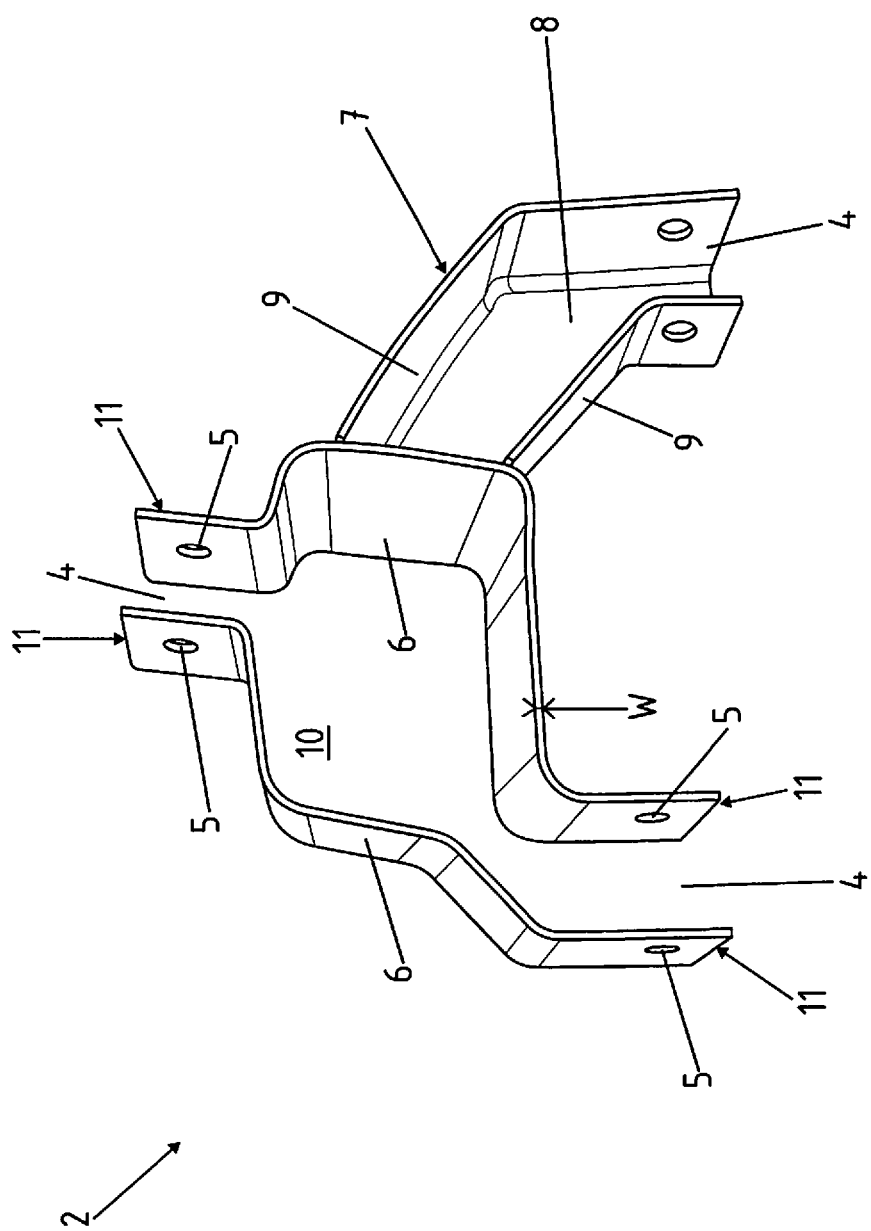

In the drawing:

FIGS. 1 and 2 show a trailing link which is known from the prior art with a wheel support as a single-shell formed component, FIG. 3 shows a longitudinal carrier with a wheel support according to the invention in a perspective view, and FIG. 4 shows the interior of a wheel support according to the invention in a view from the rear.

In the figures, the same designations are used for identical or similar components, even if a repeated description is dispensed with for reasons of simplification.

FIG. 1 shows a trailing link 1 with a wheel support 2 which is welded onto the trailing link 1, the wheel support 2 being configured as a single-shell sheet metal formed component. A flange 3 in the form of a flange plate for coupling to the wheel hub (not shown in greater detail) is shown in turn with the wheel support 2 itself.

The wheel support 2 itself is coupled in an integrally joined manner to the trailing link 1 by means of a welded connection which is not shown in greater detail.

FIG. 2 shows a rear side of the wheel support 2 which is known from the prior art, three receptacles 4 being configured in a clearly visible manner, a mounting opening 5 being configured in each case on the left-hand side and right-hand side on a receptacle 4, for receiving a threaded bolt which is not configured in greater detail, with the result that a link which is likewise not shown in greater detail can be coupled rotatably to the wheel support 2.

FIG. 3 shows one design variant of a wheel support 2 according to the invention. The wheel support 2 itself is configured as a welded component and is likewise produced with a flange 3, in particular shown here as a flange plate. The advantages in comparison with the embodiment of FIG. 2 become clear in conjunction with FIG. 4 which shows a rear view of the wheel support 2. The wheel support 2 according to the invention is configured from two clasp components 6 and a supporting component 7 as a welded component. The supporting component 7 itself has a main web 8 to this end, in each case two limbs 9 extending from the main web 8. The two clasp components 6 themselves enclose a hollow main body region 10 or configure the main body region 10, with the result that they themselves extend with their respective wall from the flange 3 which is shown in FIG. 3 toward the trailing link 1. The clasp components 6 themselves can be produced, for example, by way of folding at the edges or else in a particularly simple way using forming technology, and therefore do not require a three-dimensionally complexly shaped region.

The individual clasp components 6 can therefore be produced from different materials and/or with different wall thicknesses W. Overall, the component which is produced in this way can therefore be produced in a simple and less expensive way than the shell component which is shown in FIG. 2 and is known from the prior art, with a reduced component weight and/or an increased strength. Furthermore, it can be clearly seen in FIG. 4 that a respective end 11 of a clasp component 6 is arranged so as to lie opposite a respective end 11 of the other clasp component 6, and both ends 11 together then have mounting openings 5 and therefore configure a receptacle 4 for coupling to a link which is not shown in greater detail. The individual components can be coupled both to the trailing link 1 and/or the flange 3 by means of spot welding or else by means of welded seams. It would also be conceivable, for example, within the context of the invention that pre-fixing takes place and then the trailing links 1 with components 6, 7 which are situated in between and a flange 3 are coupled to one another in an integrally joined manner by means of resistance welding. It can be seen, in particular, from FIG. 4 that the individual components including clasp components 6 and optionally the supporting component 7 configure a lattice structure.

LIST OF DESIGNATIONS

1—Trailing link
2—Wheel support
3—Flange
4—Receptacle
5—Mounting opening
6—Clasp component
7—Supporting component
8—Main web in respect of 7
9—Limb in respect of 7
10—Main body region
11—End in respect of 6
W—Wall thickness

The invention claimed is:

1. A wheel support for a multi-link axle for mounting on a motor vehicle, comprising a flange as a receptacle for a wheel hub and at least two receptacles for rotatable coupling to links, the wheel support being coupled to a trailing link by thermal bonding, wherein the wheel support is configured as a welded component and has a main body region which comprises at least two sheet metal components which are coupled to one another by thermal bonding, the main body region having a frame work structure.

2. The wheel support according to claim 1, wherein the two sheet metal components are configured as clasp components, the clasp components extending with their wall from the flange to the trailing link and being coupled to the latter by thermal bonding in each case.

3. The wheel support according to claim 2, wherein the ends of the clasp components each have a perforation, two ends of two clasp components together forming a receptacle for the rotatable attachment of a link.

4. The wheel support according to claim 1, wherein a three-dimensionally shaped support component of U-shaped cross section is formed which comprises a main web with limbs extending from the main web, a receptacle for the rotatable attachment of a link being formed at the end of the support component.

5. The wheel support according to claim 1, wherein a clasp component and/or the support component of the wheel support is or are made from metallic material.

6. The wheel support according to claim 1, wherein a clasp component and/or the supporting component is or are made from a steel material and tempered.

7. The wheel support according to claim 6, wherein the tempering is produced by hot forming and press hardening.

8. The wheel support according to claim 1, wherein the clasp component and/or the support component have different wall thicknesses from one another and/or different strengths from one another.

9. The wheel support according to claim 1, wherein the main body region is of internally hollow configuration.

* * * * *